No. 703,437. Patented July 1, 1902.
J. S. MERRITT.
SLIDE SCALE.
(Application filed Mar. 5, 1901.)
(No Model.) 2 Sheets—Sheet 1.
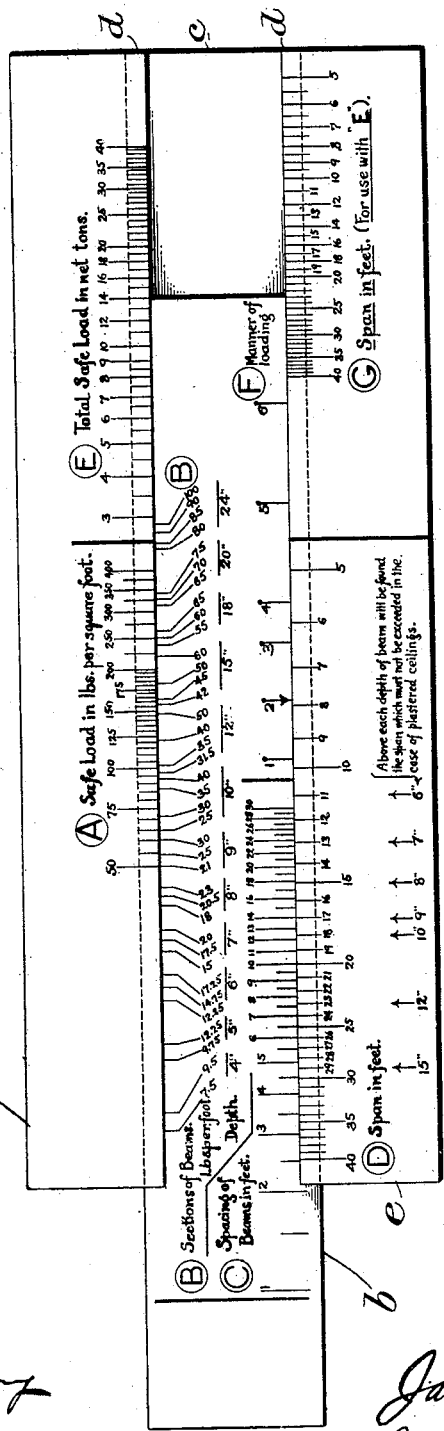
WITNESSES.
INVENTOR.
James S. Merritt
By his atty No. 703,437. Patented July 1, 1902.
J. S. MERRITT.
SLIDE SCALE.
(Application filed Mar. 5, 1901.)
(No Model.) 2 Sheets—Sheet 2.
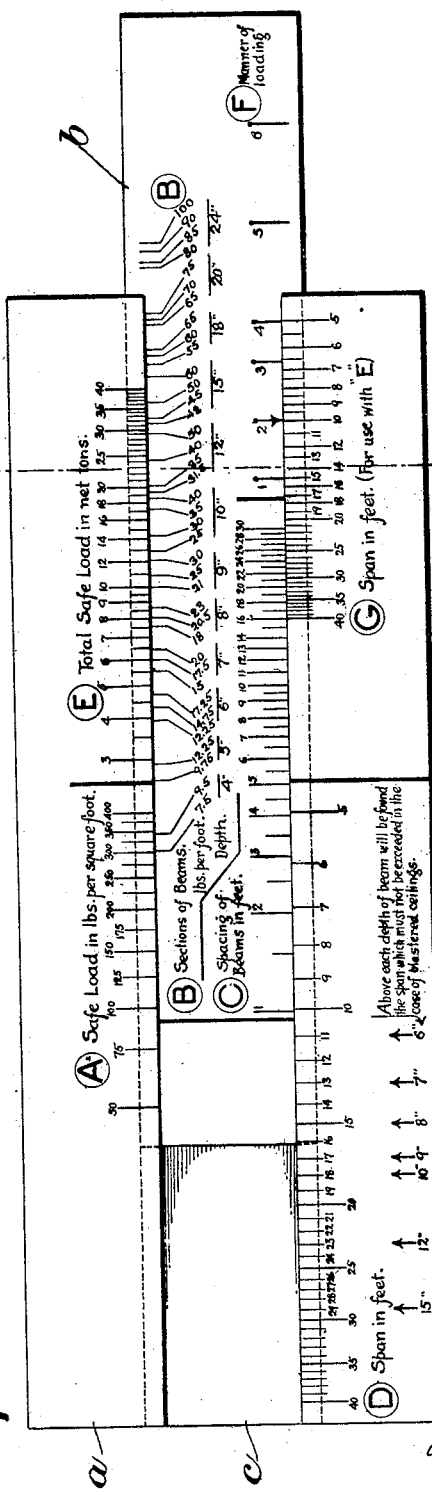
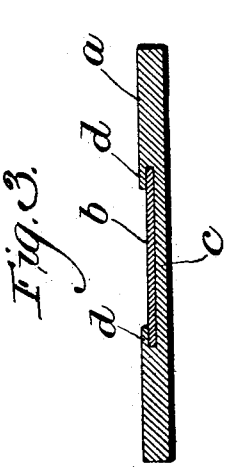
WITNESSES·
INVENTOR·

UNITED STATES PATENT OFFICE.

JAMES S. MERRITT, OF PHILADELPHIA, PENNSYLVANIA.

SLIDE-SCALE.

SPECIFICATION forming part of Letters Patent No. 703,437, dated July 1, 1902.

Application filed March 5, 1901. Serial No. 49,686. (No model.)

*To all whom it may concern:*

Be it known that I, JAMES S. MERRITT, of the city and county of Philadelphia, Pennsylvania, have invented an Improvement in Slide-Scales, of which the following is a specification.

My invention relates to slide or calculating scales and is fully set forth in the following specification and shown in the accompanying drawings.

It is the object of my invention to provide a scale or rule for calculating beam sections, loads, spans, &c., by which with some factors given the others may be ascertained without the necessity of calculation or reference to tables.

Two sets of scales are used in making the calculations involved in the solution of the problems to which my invention relates, of which one set is adapted for calculating the load per square foot over the area supported by a beam of any depth and weight of any span and spacing distance, so that with any three of the factors given the fourth may be readily ascertained, and the other set is adapted for calculating the total load for a beam of any section, of any span, and with any method of supporting and loading, so that with any three of the factors given the fourth may be obtained.

My invention relates to the combination of these two sets of scales in such a manner that either set of scales may be used with a common scale expressing the factor of the beam weights and sections.

In carrying out my invention I employ a series of scales indicating the factors laid out in distances proportional to the logarithms of each series of factors, certain scales being movable with reference to others, so that their adjustment will effect an addition or subtraction of the logarithms of the factors according to the well-known formulæ for calculating loads, &c.

My invention is fully illustrated in the accompanying drawings, in which—

Figure 1 is a plan view of my calculating-scale, showing the same in use for a calculation in which the load per square foot and the spacing distance are part of the factors employed. Fig. 2 is a similar view illustrating the same in use for a calculation in which the load in tons and manner of supporting and loading are part of the factors employed, and Fig. 3 is a cross-sectional view on the line $x\ x$ of Fig. 2.

The scale consists of two parts $a$ and $b$, having a movement with reference to one another, each part containing scales of part of the factors so arranged with reference to one another that their relative movements will have the effect of the addition or subtraction of the logarithms of the adjacent numbers in the manner well known in the construction of slide-rules. The particular manner of constructing and combining the two parts $a$ and $b$ is of course immaterial, provided they have the requisite movement with respect to one another. As shown, the part $a$ consists of a flat piece having a central longitudinal guideway $c$, in which the part $b$ is carried and may be moved longitudinally in guides $d\ d$.

The particular location or order of the scales is not material, provided they are so arranged with reference to one another that their relative movements will correspond with the mathematical calculations indicated by the formulæ.

As shown, the scales A and E are arranged at opposite ends of the upper portion of the part $a$ and scales D and G at opposite ends of the lower portion. A scale B at the upper portion of the part $b$ extends the length of the part $b$ and is common to both scales A and E, and scales C and F are arranged at the opposite ends of the lower portion of the part $b$. The scales A, B, C, and D are used for one set of calculations and the scales E, B, F, and G for another. These scales A, B, C, and D are designed for use in calculations in which the load per square foot, the beam-section, the distance between beams, and the span are factors and are based upon the formula $\frac{c}{l} = W'\, d\, l$, in which $c$ equals the coefficient of the beam-section—*i. e.*, the net load in pounds evenly distributed on a beam one foot in length supported at each end which will produce a given unit strain in the extreme fibers of the beam, $l$ equals the span of the beam in feet, $W'$ equals the load in pounds per square foot uniformly distributed over the floor carried by the given beams which will produce the given unit strain in the extreme fibers of the beam, and $d$ equals the distance in feet between the centers of parallel beams. Scale A represents the load in pounds per square foot ($W'$) and is laid off in distances equal to the logarithms of the numbers given, according to the well-known method employed in slide-rules. The only numbers given on scale A are those loads that would be met with in ordinary practice—e. g., from fifty pounds to four hundred pounds. Scale B represents the beam-sections as usually described by their depth in inches and their weight in pounds per foot and is laid off in distances equal to the logarithms of the coefficients of the standard beam-sections ($c$) of the given depths and weights. For example, the coefficient of a standard twenty-one-pound nine-inch beam is two hundred thousand. The graduation for this beam is therefore laid off at a distance equal to logarithms two hundred thousand. Scale C represents the distances in feet between the centers of parallel beams ($d$) and is laid off in distances equal to the logarithms of the numbers in the same manner as the scale A. In fact, A and C are two parts of the same scale, the logarithmic distances of the smaller numbers ("1" to "30") being given in the scale C and the distances of the larger numbers ("50" to "400") being given in the scale A. Scale D represents the span of the beams in feet ($l$) and is laid off in double the distances of the scales A or C and in the opposite direction.

From the formula $\frac{c}{l} = d\,W'\,l$ or $\frac{c}{W'} = d\,l^2$ we obtain the formula $\log c - \log W' = \log d + 2 \log l$.

The movement of the scale B with reference to the scale A is equivalent to the subtraction of logarithm $W'$ from logarithm $c$, and as the scale C is the same as scale A and scale D the double of scale C reversed it follows that the corresponding movement of the scale C is equivalent to the addition of logarithm $d$ and 2 logarithm $l$. This addition of twice logarithm $l$ is due to the fact that the scale D is laid off in twice the logarithmic distances of the scales A and C and in the opposite direction.

Having any three factors given, the fourth may readily be found. Suppose, for example, that the given conditions required a twenty-five-foot span with the beams spaced six and one-half feet apart capable of sustaining a load of fifty pounds to the square foot. To ascertain the proper beam-section for these conditions, scale C is moved until the graduation "6½" is over the graduation "25" in scale D. Then under graduation "50" in scale A will be found the proper beam weight and section in scale B, which in this case is a nine-inch twenty-one-pound beam.

Under the scale D may be arranged a series of numbers indicating depths of beam-sections placed under the appropriate spans, which must not be exceeded in the case of plastered ceilings. This is a feature, however, which forms no essential part of the slide-rule and may be omitted.

So far as calculations with the safe load in pounds per square foot, the beam weight and depth, the spacing and span as factors are concerned the scales A B C D are sufficient. It is equally desirable, however, to calculate with the total safe load in net tons, the beam weight and depth, the span and the manner of loading as factors, and for this purpose I provide the scales E, B, F, and G. As it is desirable that both slide-rules should be in one structure, I have combined them in a single rule, so arranging them that the single scale B may be used with either scale. This is accomplished by arranging the scales A, C, and D at one end and the scales E, F, and G at the other, with the scale B common to both.

The scales E, B, F, and G are based upon the formula $W_t = \dfrac{c}{2000\, l\, r}$, in which the values of $c$ and $l$ are those already given. $W_t$ equals the total load in net tons of two thousand pounds which will produce the given unit strain in the extreme fibers of a beam of given section with the given span and given manner of loading and supporting the beam, and $r$ equals the ratio of bending moments for the different manners of supporting and loading the beams. The scale E represents the total safe load in net tons ($W_t$) and is laid off in distances proportional to the logarithms of the numbers. The scale F represents the manner of supporting and loading and is laid off in distances proportional to the logarithms of the ratios of the bending moments ($r$) for the given methods of loading and support. The scale G represents the span ($l$) and is laid off in distances equal to the logarithms of the numbers, but in the opposite direction from the other scales.

In laying out the scales E, F, and G with reference to the scale B, I proceed as follows: I first arbitrarily select in the scale B some beam section and weight—e. g., a nine-inch twenty-one-pound beam. The coefficient of this beam-section is two hundred thousand, and from the formula $$W_t = \frac{c}{2000\, l\, r}$$

or $$W_t = \frac{200000}{2000\, l\, r}$$

I obtain $$W_t = \frac{100}{l\, r}.$$

Taking the value of $r$ as the unit in the scale of the ratio of bending moments—i. e., for a beam supported at both ends and uniformly loaded equals 1 and $l$ equals a ten-foot span—I obtain $W_t = \dfrac{100}{1 \times 10}$ or 10. This gives the total load in tons for a ten-foot span twenty-one-inch nine-pound beam supported at both ends with the weight uniformly distributed.

I therefore mark the number "10" on the scale E opposite the graduation "9 inch 21 lb." on the scale B and place the point "2" (indicating the unit in the scale of the ratio of bending moments) on the scale F opposite to the point "10" (indicating the span) on the scale G. Having thus ascertained the proper location of the points "10" and "10" in the scales E and G, the other graduations are laid off in distances equal to the logarithms of the numbers, the direction of the scale G being reversed, as stated. Having thus laid off the scales E and G, the scale F is completed as follows: The point "2," as stated, represents the bending moment in the case of a beam supported at both ends, with the load uniformly distributed. It also represents the bending moment for a beam supported at one end and fixed at the other, with the load uniformly distributed, and for one fixed at both ends, with the load applied at the center. It is taken as the unit, with $l$ for the value of $r$. The point "1" represents the bending moment for a beam fixed at both ends, with the load uniformly distributed, and the value of $r$ is .667. The point "3" represents the bending moment for a beam supported at one end and fixed at the other, with the load applied at the center, and the value of $r$ is 1.5. For the point "4" the beam is supported at both ends and the load is applied at the center, with the value of $r=2$. For "5" the beam is fixed at one end (cantaliver) and the load is uniformly distributed, with the value of $r=4$. For "6" the beam is fixed at one end (cantaliver) and the load is applied at the other end, with the value of $r=8$. The ratio of the factor $r$ for these different methods of loading is .667, one, 1.5, two, four, eight. The points "1," "3," "4," "5," and "6" are therefore laid out at distances equal to the logarithms of these values with reference to the point "2" as the unit.

The numbers "1" to "6" on the scale F are used arbitrarily to designate the various divisions of the scale and have no numerical significance.

The method of using the scales E, B, F, and G is as follows: From the formula $$W_t = \frac{c}{2000\,l\,r} \text{ or } \frac{c}{2000\,W_t} = l\,r$$

we obtain the logarithmic formula: log. $c$ − log. 2000 − log. $W_t$ = log. $l$ + log. $r$. The movement of the scale B with reference to the scale E is equivalent to the subtraction of both the logarithm $W_t$ and logarithm 2000 from the logarithm $c$, because in laying out the scale E (logarithm $W_t$) according to the formula the logarithm 2000, being constant in the equation, was subtracted. The formula $W_t$ as given above was obtained by dividing the selected value of $c$—i. e., two hundred thousand—by the constant two thousand, which is equivalent to the subtraction of logarithm 2000 from logarithm $c$. Consequently the positions occupied by the logarithmic values of $W_t$ and $l$ in the scales E and G with reference to the scale B are those obtained after the subtraction of the constant logarithm 2000. The resulting movement of the scales F and G is equivalent to the addition of the logarithm $r$ and logarithm $l$, the direction of the scale G being reversed.

With any three factors given the fourth may be obtained by the proper adjustment of the scales. Thus in the example shown if it is desired to ascertain the proper span to be used with a seven-inch fifteen-pound beam supported at both ends and capable of sustaining a safe load of five and one-half tons applied at the center the scale B is moved until the point "7″, 15 lb." is under "5½" in scale E, and under the point "4" in scale F, which indicates the manner of support and loading, will be found the desired factor—i. e., a five-foot span.

It will be understood that the selection of the values of the factors $c$ and $l$ in laying out the scales E, F, and G is purely arbitrary, and other values than those used may be employed without affecting the result.

Not only is it possible to find any unknown factor when three are given, but with certain two factors given the others may be ascertained. Thus with scales A, B, C, and D, if the conditions require the use of given beams—e. g., ten inches, twenty-five pounds—to sustain a given safe load of sixty-five pounds per square foot the adjustment of the scales A and B will indicate in scales C and D the various spans and spacings that may be used. So with the scales E, B, F, and G, if the conditions require a span of fifteen feet with the beam fixed at both ends and the load uniformly distributed ($r=.667$) the adjustment of the point "1" in scale F over the point "15" in scale G will indicate in the scales E and B the total safe loads and beams of which such conditions will permit the use.

What I claim as new and desire to secure by Letters Patent is as follows:

1. A scale for calculating load, section, spacing, span and manner of supporting and loading beams, consisting of two members movable with respect to one another, one of said members having at one end a scale indicating the loads in pounds per square foot laid off in distances proportional to the logarithms of the factors and a scale indicating the span laid off in distances proportional to twice the logarithms of the numbers and in the opposite direction to the scale of loads, and at the other end a logarithmic scale indicating the total loads in net tons and a scale indicating the span laid off in distances proportional to the logarithms of the numbers and in the opposite direction to said scale of loads in tons, and the other member having a scale indicating the beam-sections laid off in distances proportional to the logarithms of the coefficient of said beams and common to both the scales of loads and also having at one end a logarithmic scale indicating the spacing of the beams and at the other end a logarithmic scale indicating the ratio of the bending moments of the beams for the different methods of supporting and loading.

2. A scale for calculating loads, &c., of beams, consisting of two independent series of scales indicating the different factors laid off in distances proportional to the logarithms of said factors and a scale movable with reference to one or more of the other scales in each series and common to both series of scales laid off in distances proportional to the coefficients of beams of given sections.

In testimony of which invention I have hereunto set my hand.

JAMES S. MERRITT.

Witnesses:
ERNEST HOWARD HUNTER,
WILLIAM H. FLANDERS.